Feb. 15, 1938.  W. H. FOSTER  2,108,480
HIVE HANDLING APPARATUS
Filed March 4, 1937  2 Sheets-Sheet 1
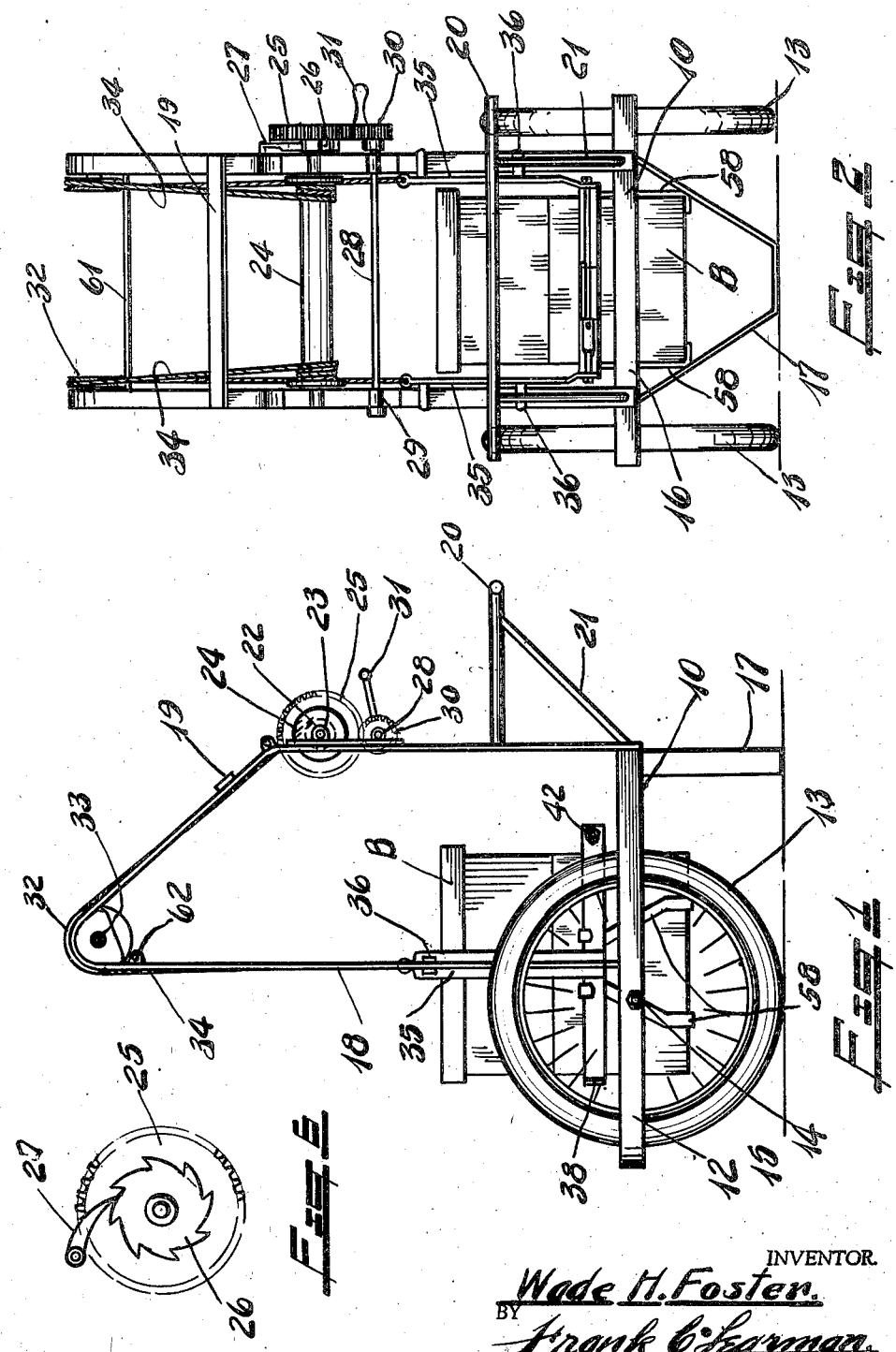
INVENTOR.
Wade H. Foster.
BY Frank C. Learman
ATTORNEY.

Feb. 15, 1938.  W. H. FOSTER  2,108,480
HIVE HANDLING APPARATUS
Filed March 4, 1937   2 Sheets-Sheet 2
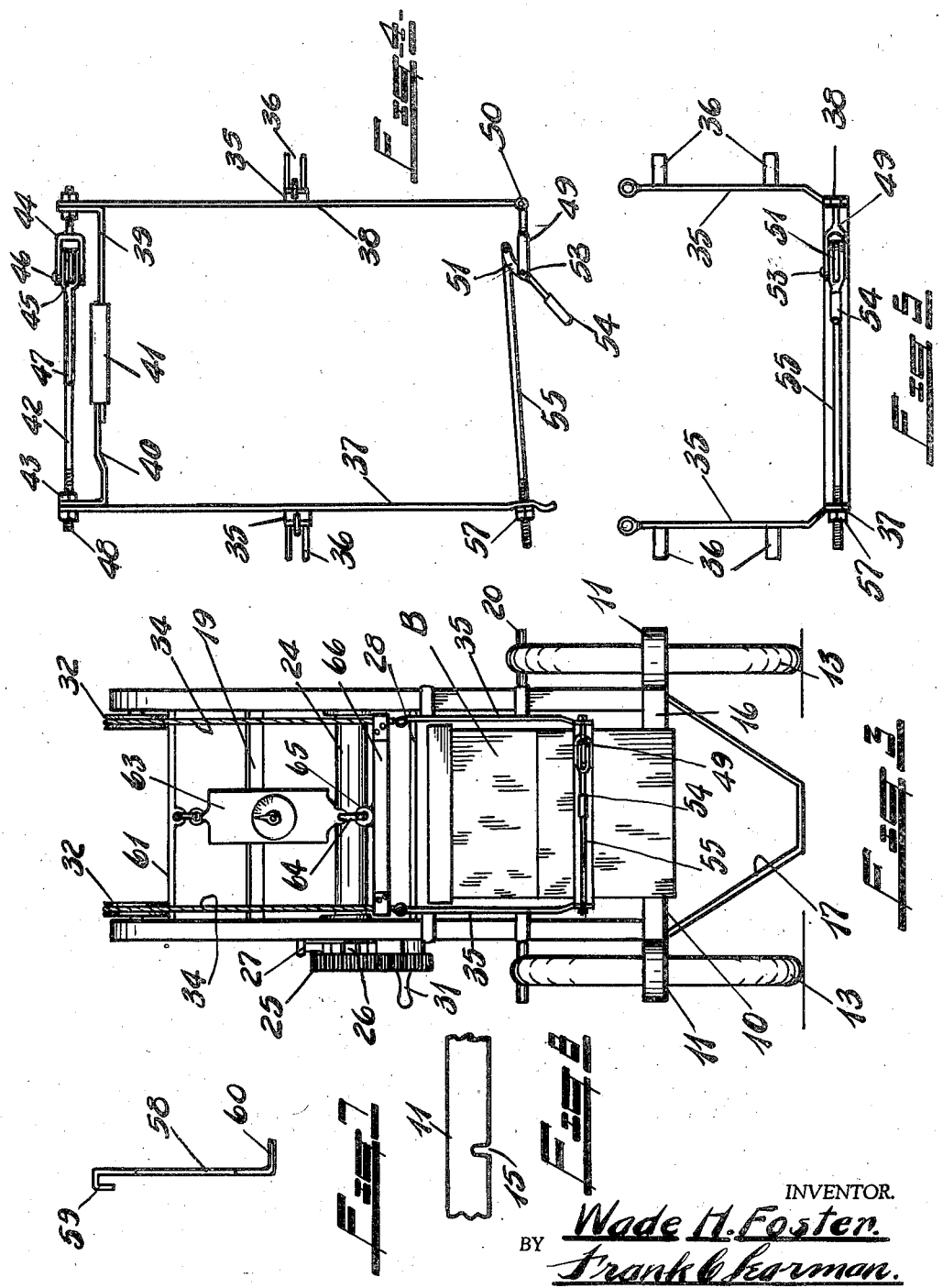
INVENTOR.
Wade H. Foster.
BY Frank C. Fearman.
ATTORNEY.

Patented Feb. 15, 1938

2,108,480

UNITED STATES PATENT OFFICE 2,108,480

HIVE HANDLING APPARATUS

Wade H. Foster, Bad Axe, Mich.

Application March 4, 1937, Serial No. 128,942

8 Claims. (Cl. 214—75)

This invention relates to bee hive handling apparatus, and more especially to a portable apparatus which can be wheeled from one location to another, so that the hives may be lifted, moved, stacked, or separated with a minimum of effort and disturbance to the hive proper.

Another object is to provide a very simple, practical, portable hive lifter provided with pneumatic tires to minimize jarring of the hives when they are being transported from one location to another, and by means of which a plurality of hives may be simultaneously handled if desired.

A further object is to provide a device which straddles the hives, so that the lifting means is centrally located above the hives to be lifted together with means for clamping and raising the hives as desired.

A further object still is to provide simple, practical and substantial means, easily operable by the workman for raising the hive or hives for disease inspection, requeening or dequeening, or when there is a heavy load on the hives and one desires to get into the broad nest with a minimum of disturbance.

A still further object is to provide an apparatus by means of which the individual hive or hives may be easily and quickly weighed to determine if the colony has sufficient honey to feed on through the winter or dormant season.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

In the drawings:

Fig. 1 is a side elevational view of my hive lifting apparatus showing the hives lifted and ready for transfer to another location.

Fig. 2 is a rear elevational view.

Fig. 3 is a front elevational view showing a weighing scale such as used for weighing the hives.

Fig. 4 is an enlarged plan of the hive clamp.

Fig. 5 is an edge view thereof.

Fig. 6 is an enlarged detail view illustrating the gear, ratchet, and dog arrangement.

Fig. 7 is an edge view of one of the stirrups.

Fig. 8 is a fragmentary side elevational view of one of the wheel housings showing the slotted opening for mounting the wheel.

In handling bee hives or in moving them from one location to another, it is essential that they be handled carefully so as not to unduly jar the hive and excite the bee colony housed therein, and this is difficult when performed by hand by the workman inasmuch as the hives are bulky, the edges of the hives (when stacked or superimposed) stick together and must be tilted to break them apart for removal of honey, inspection, feeding, or to carry from one location to another, and I have therefore, provided a portable, pneumatic tired vehicle, provided with means for easily and smoothly lifting the hives and holding them in lifted or raised position as they are moved or for any other desired reason.

Referring now to the drawings in which I have shown the preferred embodiment of my invention, the device includes a chassis 10 preferably formed of bar iron and comprises spaced apart wheel housings 11 formed by means of a bar bent as shown to accommodate a wheel 13 between the walls thereof, and the wheel axle or spindle 14 is mounted in suitable slots 15 provided in each housing to facilitate the easy mounting or removal thereof, the rear end of these housings being connected to a transversely disposed bar 16 as shown, and a depending leg 17 serves to support the rear end of the chassis when stationary, the front end being open to permit the wheels to straddle a bee hive "B", so that the lifting mechanism overhangs the hives to facilitate the lifting, weighing, transfer, or inspection thereof when desired.

The superstructure is preferably formed of bar iron and comprises a pair of bars 18 bent to shape as clearly shown in Figs. 1 and 2 of the drawings and forming tracks, the lower ends being welded or otherwise secured to the wheel housings 11, and the frame member 16 respectively, a brace 19 serving to reinforce and hold the bars in spaced relation, a handle 20 being welded to the bars 18 and is suitably braced by means of braces 21, said handle being provided to facilitate the movement of the apparatus from one location to another.

Suitable bearings 22 are provided on the superstructure, and a shaft 23 is journaled therein, a drum 24 being mounted on said shaft, and a gear 25 is mounted on one end thereof, a ratchet wheel 26 (see Fig. 6) being formed integral with the gear, and a dog 27 is pivotally mounted on the frame for engagement with the ratchet wheel to hold the drum in set position.

A similar shaft 28 is also journaled in bearings 29 on the frame, and a spur gear 30 is mounted therein, a crank 31 being provided on said gear, said gear meshing with and driving the gear 25 for a purpose to be presently described.

Individual sheaves 32 are journaled on pins 33 provided on the end of the frame as shown, and cables 34 are anchored to the drum 24, said cables being trained over the sheaves 32, thence leading downwardly and being anchored to slider guides 35 which form a part of the hive clamps, each guide being provided with spaced apart, forked legs 36 which slidably engage the bars 18, and freely slide thereon, so that as the crank 31 is turned to rotate the drum and wind the cables 34 thereon, these slider guides will slide on the tracks 18 and guide the hive as it is being handled.

The hive clamp is formed as clearly shown in Figs. 4 and 5, and comprises side bars 37 and 38 respectively, an end bar 39 being secured to the bar 37 at a point spaced from the end thereof, and a similar bar 40 is welded to the opposite bar 38, the ends of these bars 39 and 40 being slidably mounted in a keeper 41.

A threaded rod 42 connects the extreme ends of the side bars 37 and 38, and nuts 43 are provided for adjustment as desired, a yoke 44 being provided intermediate the length of the rod and a similar yoke 45 is pivotally mounted on the legs thereof by means of the pin 46, and is provided with a handle 47 as shown, the opposite end section 48 of the rod being pivotally connected to the end of the yoke 45 and when the handle is swung to locked position, the side bars 37 and 38 will be tightly clamped to the hive. A similar arrangement is provided on the opposite end of the clamps and includes a yoke member 49 pivotally connected to side bar at 50, a similar yoke 51 is pivotally connected to the yoke 52 at 53 and includes the handle 54, one end of a rod 55 being pivotally connected to the yoke 51, the opposite end of said rod being threaded and engaging in a slotted passage in the end of the bar 37, a nut 57 being threaded on the end of the rod, to adjust said rod, and it will be obvious that by manipulation of the locking handle 54 that the clamp can be firmly fixed and secured to the hive.

To prevent slippage etc. I provide stirrups 58, (see Fig. 7) the upper end of each stirrup being hook shaped as at 59 to engage the edges of the side clamps, the lower end 60 of each stirrup being turned at right angles to the main body to engage the bottom of the hive so that a positive support is assured.

In practice the hive lifter is wheeled to straddle the hives, the clamp and the stirrups are fixed in proper position, the operator then rotates the crank 31 to rotate the drum 24, winding the cables 34 thereon, and raising the hives, the slider guides preventing any swing or sway, and when the hives have been raised to desired position the dog 27 engages the toothed ratchet 26 to hold it in adjusted position, and when the dog is released the crank movement can, of course, be reversed.

For the purpose of weighing the hives to determine if the hive contains the proper amount of honey, I provide a removable rod 61, the ends of which engage suitable openings 62 provided in the frame, a scale 63 is mounted on this rod, and is provided with a hook 64, which engages an eye 65 provided in the bar 66, which bar is clamped to the cables 34 at a point directly adjacent the ends of the slider guides, and in practice the hive or hives are lifted a distance sufficient to permit the hook 64 of the scale 63 to engage the eye 65 of the bar 66, then by slacking off on the cables, the hives will be suspended on the scale which will then register the correct weight, the scale is then unhooked, the hive lowered, and the next hive is weighed. After the weighing is completed the scale and bar is removed and the apparatus is now ready for use in the usual manner.

From the foregoing description it will be obvious that I have perfected a simple, practical, substantial and convenient apparatus for lifting, moving, weighing and handling hives as desired.

What I claim is:

1. A portable hive lifter comprising a two wheeled frame, open at its forward end to straddle a bee hive vertically disposed tracks secured to said frame, a hive clamp provided with legs slidably associated with said tracks, and means for raising or lowering said hive clamp.

2. A portable hive lifter of the class described and comprising a portable two-wheeled frame, open at its forward end to straddle a bee hive vertically disposed tracks mounted on the frame at a point slightly in the rear of the wheels, vertically adjustable hive clamping means slidably engaging said tracks, a winding drum, and flexible means connected to said clamping means and adapted to be wound on said drum for raising or lowering said hive clamping means when the drum is rotated.

3. A hive lifter of the class described and comprising a pneumatic two wheeled frame open at its forward end to admit a bee hive, and provided with spaced apart, vertically disposed track members, a hive clamping means slidably engaging said track members, a winding drum, cables anchored thereto and to the hive clamping means, and means for rotating said winding drum to raise or lower the hive clamping means on the track, and a supporting leg on the rear end of said frame.

4. A hive lifter of the character described and comprising a U-shaped, two wheeled frame adapted to straddle a bee hive and including spaced apart, vertically disposed tracks, a hive clamp including slider guides provided with legs engageable with said tracks, sheaves on the upper ends of the tracks, a winding drum, flexible means anchored to said guides and leading over said sheaves, and means for rotating said winding drum to wind the flexible means thereon.

5. A portable hive handling apparatus of the class described and comprising a two wheeled frame open at its forward end to accommodate a bee hive, a supporting leg on the rear end of the frame, said frame including vertically disposed track members provided with sheaves on the upper ends thereof, a collapsible hive lifting mechanism including slider guides engaging said tracks, a winding drum, and cables anchored to said guides and trained over said sheaves with the free ends anchored to said winding drum, means for rotating said drum, and means for holding it in adjusted position.

6. A portable hive lifting apparatus of the character described and comprising a U-shaped truck, vertically disposed tracks, and adjustable, collapsible hive clamp mounted on said track and including slider guides adapted to slidably engage said tracks, stirrups mounted on said clamp and engageable with one of the hives, a winding drum, cables connected to said slider guides and to said drum, a crank for rotating said drum, and means for holding the drum in set position.

7. A hive lifting apparatus of the character described and including wheeled housings connected together at the rear end only, vertically disposed track members mounted thereon and connected to said housings at a point intermediate their length and at the rear ends thereof, a collapsible, adjustable hive clamp associated with the track and provided with guides engageable therewith, stirrups detachably secured to the clamp, a winding drum, cables attached to said guides and to said drum, and means for actuating said drum to wind the cables thereon to raise said hive clamp.

8. A hive lifting apparatus including a frame having spaced apart wheel housings connected at their rear ends only, wheels journaled in said housings, vertically disposed tracks forming a superstructure, a winding drum mounted on said superstructure, a collapsible hive lifter including guides engageable with the tracks, stirrups removably secured thereto and adapted to engage a hive, sheaves on the upper ends of the tracks, cables secured to the guides and leading over said sheaves with the ends anchored to said drum, means for rotating said drum, and means for holding it in adjusted position.

WADE H. FOSTER.